US009046608B2

(12) United States Patent
Hong (10) Patent No.: US 9,046,608 B2
(45) Date of Patent: Jun. 2, 2015

(54) SYSTEM FOR DETECTING SEA-SURFACE WIND, USING SATELLITE OBSERVATION, AND A METHOD FOR DETECTING SEA-SURFACE WIND

(71) Applicant: Korea Meteorological Administration, Seoul (KR)

(72) Inventor: Sung Wook Hong, Bucheon-si (KR)

(73) Assignee: KOREA METEOROLOGICAL ADMINISTRATION, Seoul (KR)

(*) Notice: Subject to any disclaimer, the term of this patent is extended or adjusted under 35 U.S.C. 154(b) by 172 days.

(21) Appl. No.: 13/659,706

(22) Filed: Oct. 24, 2012

(65) Prior Publication Data

US 2013/0147659 A1    Jun. 13, 2013

(30) Foreign Application Priority Data

Oct. 24, 2011    (KR) .................... 10-2011-0108673

(51) Int. Cl.
  *G01S 13/95*    (2006.01)
  *G01W 1/10*    (2006.01)
  *G01S 13/00*    (2006.01)

(52) U.S. Cl.
  CPC ............. *G01S 13/955* (2013.01); *G01W 1/10* (2013.01)

(58) Field of Classification Search
  CPC ....... G01S 13/88; G01S 13/95; G01S 13/955; G01W 1/00; G01W 1/10; G01J 1/02; G01J 1/10; G01J 1/20; G01J 1/42; G01J 2001/4266; G01J 1/44; G01J 5/00; G01J 5/02; G01J 5/10
  USPC ........... 342/22, 25 R–26 D, 27, 28, 118, 123, 342/159, 175, 188, 192–197, 350–352, 385, 342/417, 422, 425; 73/23.2, 29.01, 170.16, 73/170.29, 170.31, 170.27; 356/27, 28, 356/28.5, 213, 216; 702/1, 2, 3, 22; 703/2
  See application file for complete search history.

(56) References Cited

U.S. PATENT DOCUMENTS

| | | | | | |
|---|---|---|---|---|---|
| 3,016,529 | A | * | 1/1962 | Kramp | 342/188 |
| 3,883,876 | A | * | 5/1975 | Roeder et al. | 342/425 |
| 3,893,117 | A | * | 7/1975 | Nirasawa et al. | 342/159 |
| 3,911,435 | A | * | 10/1975 | Mardon et al. | 342/351 |
| 4,034,190 | A | * | 7/1977 | White | 702/22 |
| 4,081,679 | A | * | 3/1978 | Cohn | 342/351 |

(Continued)

FOREIGN PATENT DOCUMENTS

| | | | | |
|---|---|---|---|---|
| EP | 1262792 A1 | * | 12/2002 | G01S 13/00 |
| WO | WO2010/052530 A1 | * | 5/2010 | G01S 13/86 |

*Primary Examiner* — Bernarr Gregory
(74) *Attorney, Agent, or Firm* — DLA Piper LLP (US)

(57) ABSTRACT

Systems and methods are provided that involve obtaining emissivity and reflectivity by the ratio of the radiance temperature versus the sea level temperature as observed by a satellite, and may further calculate two reflectivity values observed or simulated by the vertical or horizontal polarized channels of microwave, and then estimate a surface roughness. Further, illustrative implementations may involve obtaining the regression relation expression between the surface roughness and the wind strength and then detecting the sea-surface wind, using the information observed by the satellite again. As such, the sea-surface wind information can be obtained through satellite observation, and the information can be utilized for preventive activities against disaster including typhoon, the energy industry including wind power and the fishery in quasi-real time.

15 Claims, 9 Drawing Sheets
(5 of 9 Drawing Sheet(s) Filed in Color)

(56) References Cited

U.S. PATENT DOCUMENTS

| | | | | |
|---|---|---|---|---|
| 4,172,255 A | * | 10/1979 | Barrick et al. | 342/26 D |
| 4,499,470 A | * | 2/1985 | Stacey | 342/352 |
| 4,633,255 A | * | 12/1986 | Trizna | 342/26 D |
| 4,748,448 A | * | 5/1988 | Thompson | 342/26 A |
| 4,843,597 A | * | 6/1989 | Gjessing et al. | 342/22 |
| 4,853,702 A | * | 8/1989 | Shiokawa et al. | 342/352 |
| 4,928,131 A | * | 5/1990 | Onozawa | 342/188 |
| 4,996,533 A | * | 2/1991 | May et al. | 342/26 D |
| 5,053,781 A | * | 10/1991 | Milman | 342/351 |
| 5,175,555 A | * | 12/1992 | Holak et al. | 342/175 |
| 5,264,852 A | * | 11/1993 | Marquet | 342/26 A |
| 5,313,210 A | * | 5/1994 | Gail | 342/25 A |
| 5,469,168 A | * | 11/1995 | Anderson | 342/26 D |
| 5,526,676 A | * | 6/1996 | Solheim et al. | 73/29.01 |
| 5,552,787 A | * | 9/1996 | Schuler et al. | 342/25 A |
| 5,631,414 A | * | 5/1997 | Cherny | 73/170.27 |
| 5,703,594 A | * | 12/1997 | Anderson | 342/22 |
| 5,796,471 A | * | 8/1998 | Wilkerson et al. | 356/28.5 |
| 5,805,106 A | * | 9/1998 | Baum | 342/159 |
| 5,808,741 A | * | 9/1998 | Anderson | 73/170.31 |
| 6,137,433 A | * | 10/2000 | Zavorotny et al. | 342/26 B |
| 6,137,437 A | * | 10/2000 | Lin et al. | 342/26 A |
| 6,255,980 B1 | * | 7/2001 | Matthews | 342/22 |
| 6,359,584 B1 | * | 3/2002 | Cordey et al. | 342/188 |
| 6,864,826 B1 | * | 3/2005 | Stove | 342/22 |
| 7,145,503 B2 | * | 12/2006 | Abramovich et al. | 342/159 |
| 7,460,063 B2 | * | 12/2008 | De Maagt et al. | 342/351 |
| 7,746,267 B2 | * | 6/2010 | Raney | 342/25 F |
| 7,796,082 B2 | * | 9/2010 | Wood | 342/26 R |
| 8,401,793 B2 | * | 3/2013 | Nghiem et al. | 342/26 A |

* cited by examiner

```
y2=rough_rms69(index_p3)

measure_errors=replicate(0.01,n_elements(y))

result=poly_fit(x,y,1,yfit,$
       sigma=sigma,measure_errors=measure_errors)
print,'coefficient 6GHz=>',result
print,'standard errors 6Hz=>',sigma measure_errors=replicate(0.01,n_elements(y1))

result1=poly_fit(x1,y1,1,yfit,$
       sigma=sigma,measure_errors=measure_errors)
print,'coefficient 6GHz=>',result1
print,'standard errors 6GHz=>',sigma measure_errors=replicate(0.01,n_elements(y2))

result2=poly_fit(x2,y2,1,yfit,$
       sigma=sigma,measure_errors=measure_errors)
print,'coefficient 6GHz=>',result2
print,'standard errors 6GHz=>',sigma wind=findgen(22)
for it=0,21 do begin
if(wind(it) le 5 ) then begin
result 3(it)=result[0]+result[1]*wind(it)
endif if(wind(it) gt 5 and wind(it) le 15 ) then begin
result3(it)=result1[0]+result1[1]*wind(it)
endif if(wind(it) gt 15 and wind(it) le 21 ) then begin
result3(it)=result2[0]+result2[1]*wind(it)
endif
endfor oplot,wind,result3,color=250,linestyle=0 plots,windspeed,rough_rms10,color=50,psym=1,symsize=0.5 index_p4=where((windspeed le 5) and (windspeed ge 0) and (rough_rms10 ne -999.))
index_p5=where((windspeed le 15) and (windspeed gt 5) and (rough_rms10 ne -999.))
index_p6=where((windspeed le 21) and (windspeed gt 15) and (rough_rms10 ne -999.))

x3=windspeed(index_p4)
y3=rough_rms10(index_p4)
x4=windspeed(index_p5)
y4=rough_rms10(index_p5)
x5=windspeed(index_p6)
y5=rough_rms10(index_p6)

measure_errors=replicate(0.01,n_elements(y3))

result4=poly_fit(x3,y3,1,yfit,$
      sigma=sigma,measure_errors=measure_errors)

print,'coefficient 10GHz=>',result4
print,'standard errors 10GHz=>',sigma measure_errors=replicate(0.01,n_elements(y4))

result5=poly_fit(x4,y4,1,yfit,$
"scat_hong.pro" [readonly] 224L, 5800C                        231.1    56%
```

FIG. 6D

SYSTEM FOR DETECTING SEA-SURFACE WIND, USING SATELLITE OBSERVATION, AND A METHOD FOR DETECTING SEA-SURFACE WIND

CROSS-REFERENCE TO RELATED APPLICATIONS

This application claims the benefit of priority of Korean Patent Application No. 10-2011-0108673 filed on Oct. 24, 2011 in the Korean Intellectual Property Office, the entire contents of which are hereby incorporated by reference.

BACKGROUND

1. Field

The following description relates to a method and a system for implementing the wind information on the sea, that is, the sea-surface wind information, from satellite observation.

2. Description of the Related Art

The sea-surface wind information is the very important information in various fields including preventive activities against a disaster, such as typhoon. For example, the sea-surface wind information can be utilized for the wind energy industry and is the very important information in marine activities including the fishery. In general, since the sea-surface wind strength is very closely associated with a physical change in the sea level resulting from it, a physical relation between them is derived to indirectly obtain the magnitude of the sea-surface wind. The sea-surface wind can be measured by direct observation using a buoy data or a ship, but it is impossible to monitor and observe the wide sea substantially in quasi-real time, and it can be said that only satellite observation is the only way to do so. In general, in order to observe the magnitude of the sea-surface wind by a satellite, sensors that can observe a wavelength range of microwave are needed, such as AMSR-E (Advanced Microwave Scanning Radiometer), SSM/I (Special Sensor Microwave/Imager), TMI (Tropical Microwave Imager).

The physical state of the sea level has a very important effect on the emissivity of the sea level. In general, the sea has characteristics of low emissivity and high reflectivity. The wind on the sea level is one of main factors that increase the reflectivity and emissivity to change energy observed by a satellite.

Many inventors have studied the characteristics for a long time, and the characteristics of sea-surface wind have been detected using an active microwave sensor, such as ASCAT, QUICKSCAT or by mounting a passive microwave sensor, such as SSM/I, AMSR-E, TMI on a satellite. Most of the studies have used a forward model based on very many known information items including the characteristics of wind and the sea level. However, these techniques have revealed a limit in obtaining the sea-surface wind information and have a problem with accuracy.

SUMMARY

Aspects of the present inventions relate to solving the problems described above. For example, illustrative implementations may provide a method of detecting sea-surface wind that enables the sea-surface wind information to be efficiently produced, using a satellite. In other words, aspects of the innovations may relate to a method and a system for producing the sea-surface wind information very quickly, e.g., in quasi-real time via an in-reverse conversion method by utilizing energy observed by a satellite as an input data, instead of the existing technique based on a forward model requiring many known information items.

In such regard, present implementations may involve a method and a system for producing the sea-surface wind information by detecting the sea level roughness using the polarized property of electromagnetic wave based on a satellite data.

In order to solve the problems described above, implementations may provide a system for estimating the wind strength as a function of the surface roughness, using a physical relation between the wind and the surface roughness.

More specifically, some implementations may obtain emissivity or reflectivity by the ratio of the radiance temperature versus the temperature at sea level (hereinafter referred to as "sea level temperature") as observed by a satellite, further calculates two reflectivity values observed or simulated by the vertical or horizontal polarized channels of microwave, and then estimates a surface roughness. Further, implementations may obtains the regression relation expression between the surface roughness and the wind strength, and then detect the sea-surface wind, using the information observed by the satellite again.

According to implementations herein, the sea-surface wind information can be very accurately provided in quasi-real time based on satellite observation. As such, when a disaster including typhoon occurs, the innovations can be advantageously used. Further, implementations herein may benefit various industries and economy substantially by providing essential information to the wind energy industry and the fishing industry.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which constitute a part of this specification, illustrate various implementations and aspects of the innovations herein and, together with the description, help illustrate the principles of the present inventions. The file of this patent contains at least one drawing executed in color. Copies of this patent with color drawings will be provided by the Office upon request and payment of the necessary fee. In the drawings:

FIGS. 3 and 4 illustrate examples of implementing a software system for producing sea-surface wind according to the invention;

FIGS. 6a-6D illustrate the results of verifying the results of producting the sea-surface speed according to the invention.

DETAILED DESCRIPTION

Hereinafter, a configuration and an effect according to the invention are described in detail by reference to the accompanying drawings. In describing the invention by reference to the accompanying drawings, the same components are provided with the same reference numerals throughout the entire figures, and description thereof will not be repeated. Although the terms of a first, a second or so can be used for describing various components, the components should not be limited to the terms. The terms are used only for the purpose of distinguishing one component from the others.

Figure 1:
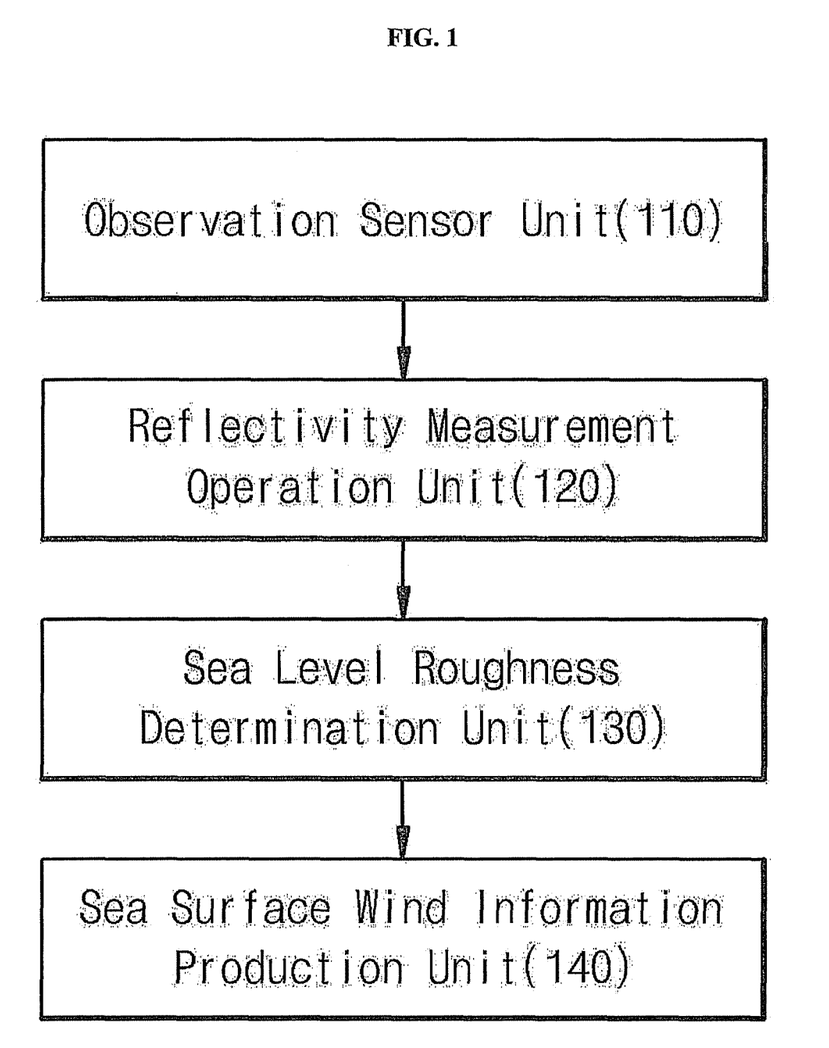
FIG. 1 is a diagram illustrating an example of a system for detecting sea-surface wind according to the invention.
Figure 2:
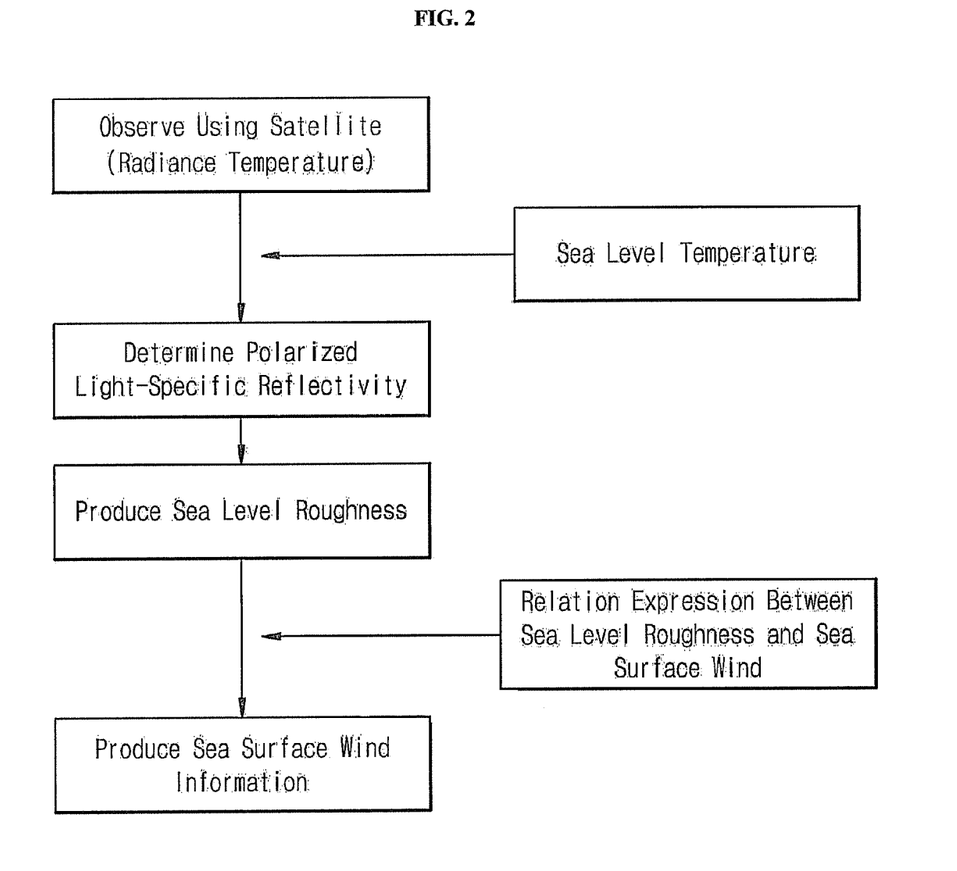
FIG. 2 is a block diagram illustrating an example of a method of detecting the sea-surface wind information, using the system according to the invention.

FIG. 1 is a diagram illustrating an example of a system for detecting sea-surface wind according to the invention, and FIG. 2 is a block diagram illustrating an example of a method of detecting the sea-surface wind information, using the system according to the invention.

Referring to FIGS. 1 and 2, the system for detecting sea-surface wind according to the invention can comprise an observation sensor 110 that senses the radiance temperature of sea water or the sea level temperature using a sensor mounted on a satellite, a reflectivity measurement operation unit 120 that produces polarized a light-specific reflectivity using the radiance temperature or the sea level temperature transmitted from the observation sensor unit 110, a sea level roughness determination unit 130 that determines the sea level roughness by using the polarized light-specific reflectivity produced by the reflectivity measurement operation unit 120, and a sea-surface wind information production unit 140 that determines a relation between the produced sea level roughness and the magnitude of sea-surface wind and produces the sea-surface wind information.

In this case, the observation sensor unit 110 is of a concept that includes an observing module including an observation sensor unit of a satellite, and a polar orbit satellite data in US referred to as AQUA is used as an example herein. It is a satellite data is commonly used for observing sea-surface wind and producing the sea-surface wind information.

In addition, most of the observation sensor units use microwave sensors, which are mounted on polar orbit satellites due to the characteristics of such microwave sensors. For example, the AMSR-E sensor of an Aqua satellite, a polar orbit satellite, and the SSM/I observation data of the DMSP satellite are widely used all over the world.

As an observation channel, 6.9 GHz, 10 GHz, 19 GHz or the like is used. Observation can be carried out over microwave channels in a wavelength range with higher frequencies, but in this case measurement accuracy becomes gradually lower.

The reflectivity measurement operation unit 120 produces a polarized light-specific reflectivity using the radiance temperature or the sea level temperature transmitted from the observation sensor unit 110. In other words, the reflectivity measurement operation unit determines a polarized light-specific reflectivity using the observed radiance temperature and the sea level temperature. Equation 1 below is widely used for obtaining the reflectivity of sea level from satellite observation all over the world.

$$R_R = (T_B - T_\uparrow - T_S \cdot \Gamma) \cdot [\{T_\downarrow(1+\Omega) - T_S\} \cdot \Gamma]^{-1}$$ [Equation 1]

wherein, $R_R$ represents a reflectivity, $T_S$ represents a sea level temperature, $T_B$ represents a radiance temperature observed over a microwave channel of AQUA AMSR-E, and $T_\uparrow$ and $T_\downarrow$ are terms showing an atmospheric effect.

$\Gamma$ represents an atmospheric transmittance. The fit parameter $\Omega$ is a correction parameter representing how much $T_\downarrow$ is scattered.

In addition, the sea level roughness determination unit 130 determines the roughness of the sea level using the polarized light-specific reflectivity produced by the reflectivity measurement operation unit 120. Specifically, the roughness of the sea level is measured by Equation 2 below, which comprises the wavelength, the satellite zenith angle, and the vertical and horizontal reflectivities of the observed channel, using the polarized light-specific reflectivity produced by the reflectivity measurement operation unit.

$$\sigma \approx \frac{\lambda}{4\pi\cos\theta} \cdot \sqrt{\ln\left(\frac{R_{R,H}^{sec^2\theta}}{R_{R,V}}\right)}$$ [Equation 2]

(wherein, $R_V$ is a component of polarized light in reflectivity and represents a vertical reflectivity in vertical polarization of light, and $R_H$ is a component of polarized light in reflectivity and represents a horizontal reflectivity in horizontal polarization of light. $R_R$ represents the observed polarized reflectivity, and $\theta$ represents a satellite zenith angle.)

When the producing system according to Equation 2 described above is used, the roughness of a sea-surface wind is very accurately detected.

In addition, the sea-surface wind information production unit 140 determines a relation between the produced roughness of the sea level and the magnitude of the sea-surface wind and produces the sea-surface wind information.

Specifically, it is a relation expression between the sea-surface wind and the roughness of the sea level, which was obtained using FASTEM-2, the earth surface/sea level information module of the radiation transfer model used in various satellite obserbations in US and Europe, as in Table 1 below. The linear regression equation was used, and information items were classified according to the wind strength and the observed wavelength. In this case, AMSR-E sensors are classified into 6.9, 10, 18 GHz channels and the wind strength is classified into weak wind (below 5 m/s), mesoscale wind (5-10 m/s), and strong wind (over 15 m/s).

TABLE 1

| Channel | SSW | Slope | Offset |
|---------|-----|-------|--------|
| 6.9 GHz | <5 ms$^{-1}$ | 0.00786484 | 0.0182238 |
|  | 5~15 ms$^{-1}$ | 0.00665046 | 0.0233580 |
|  | >15 ms$^{-1}$ | 0.00745813 | 0.0121359 |
| 10 GHz | <5 ms$^{-1}$ | 0.00515418 | 0.0127663 |
|  | 5~15 ms$^{-1}$ | 0.00436252 | 0.0162764 |
|  | >15 ms$^{-1}$ | 0.00489410 | 0.00890625 |
| 18 GHz | <5 ms$^{-1}$ | 0.00363695 | 0.00990545 |
|  | >5 ms$^{-1}$ | 0.00277569 | 0.0139433 |

In Table 1, SSW, slope and offset mean a wind strength, a gradient and an intercept value, respectively. These coefficients were obtained using the linear regression equation, the FASTEM-2 model and GDAPS (Global Data Assimilation and Prediction System) data. The result of utilizing them is shown in FIG. 1. In particular, when the system described above is used, the sea-surface wind strength is very accurately detected.

A method of detecting sea-surface wind by using the system according to the invention is described using a block diagram in FIG. 2. First, a relation expression (or a look-up table) between the sea level roughness and the sea-surface wind is prepared, polarized light-specific reflectivities by seal level channels are produced using the radiance temperature measured by a satellite, a roughness is operated on the basis of the produced reflectivity, and the sea-surface wind information is determined using the relation expression (or the look-up table) wherein the sea level roughness as an input data.

As described above, the invention can implement a method of detecting the sea-surface wind comprising a section that prepares a relation expression (or a look-up table) between the sea level roughness and the sea-surface wind, a section that detects the sea level roughness, and a section that produces the sea-surface wind, and the sea-surface wind detection system by software. Therefore, the system and the method according to the invention can be configured as software, which can be manufactured in the form of a computer-readable record medium in which a software program to execute them is contained.

Figure 4:
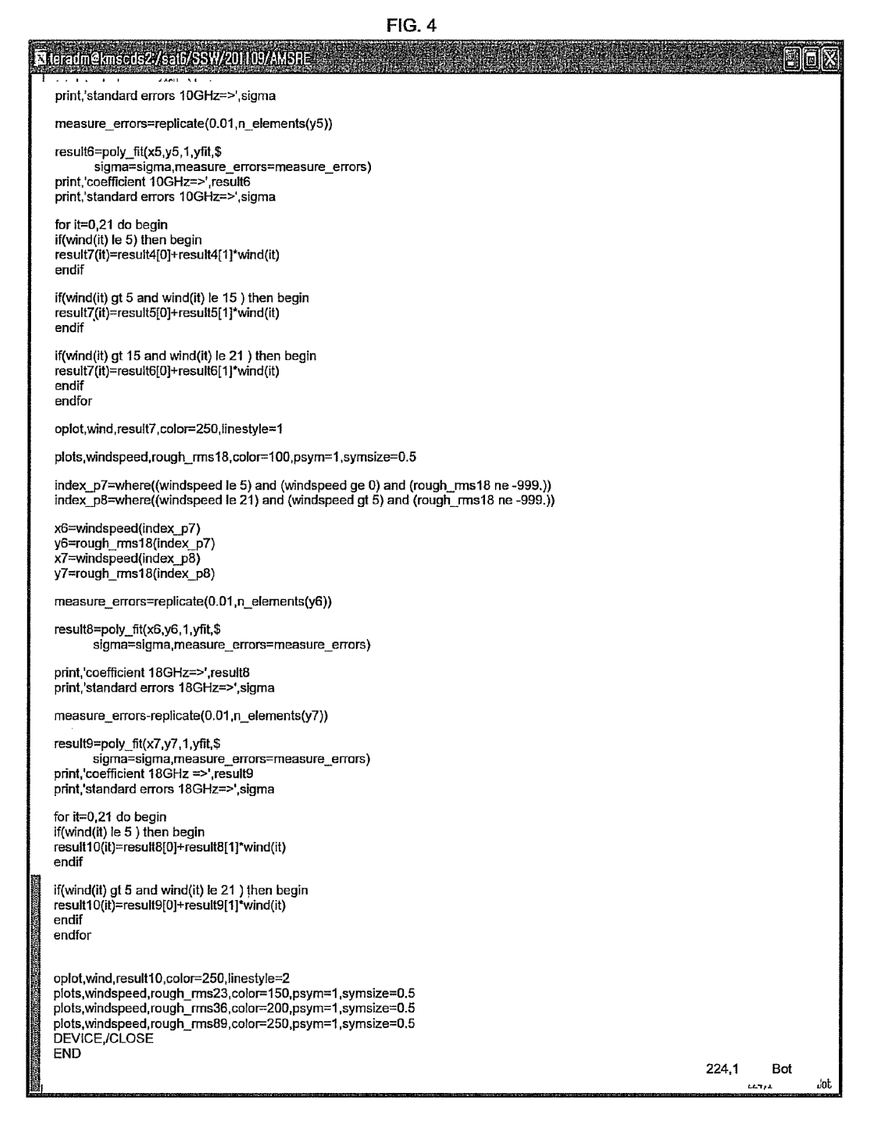

FIGS. 3 and 4 illustrate examples of implementing the software system for producing the sea-surface wind according to the invention.

Figure 5:
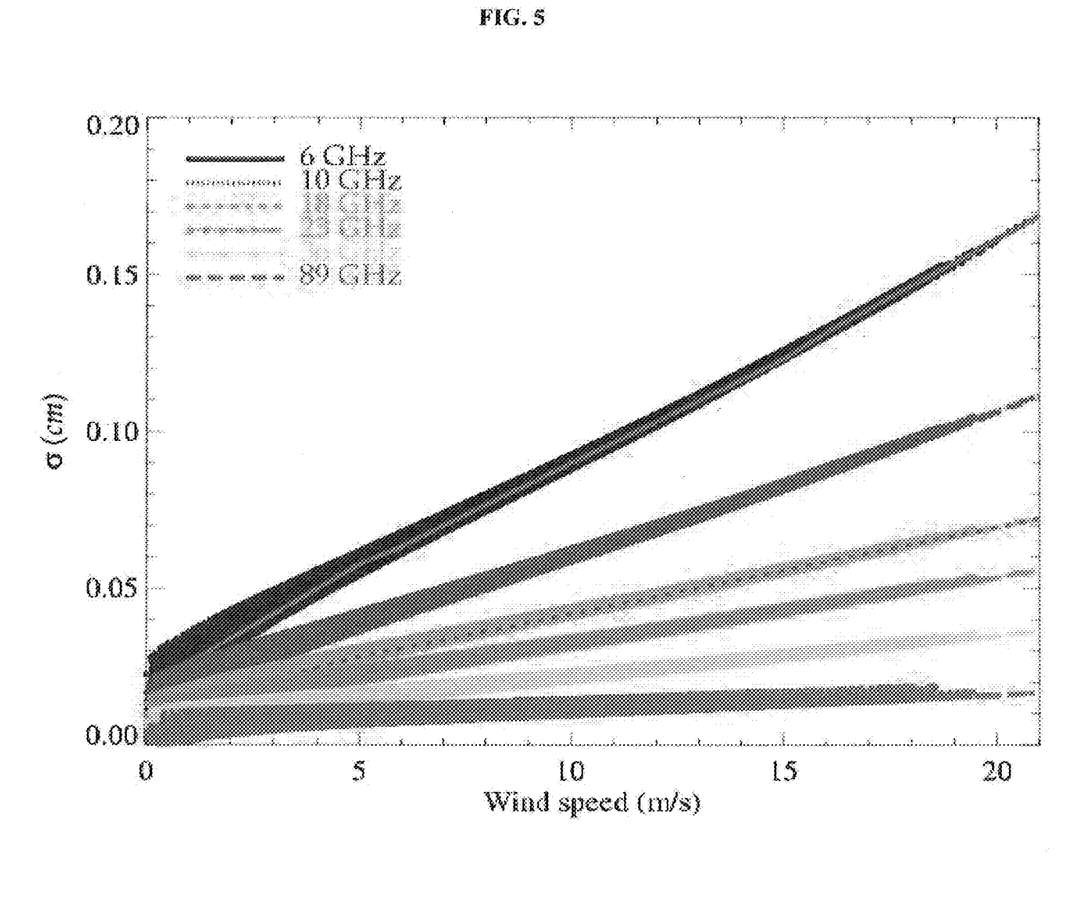
FIG. 5 illustrates an example of a relation expression between the sea-surface wind speed and the sea level roughness by using a satellite microwave sensor.
Figure 6A:
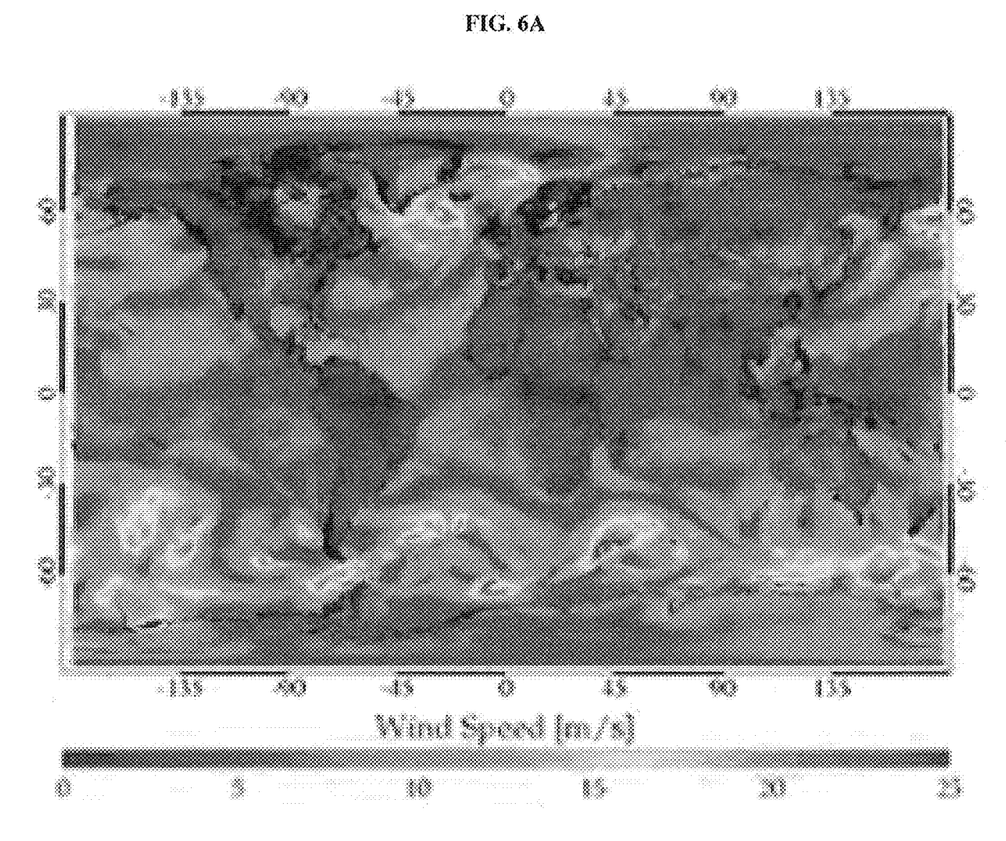
Figure 6B:
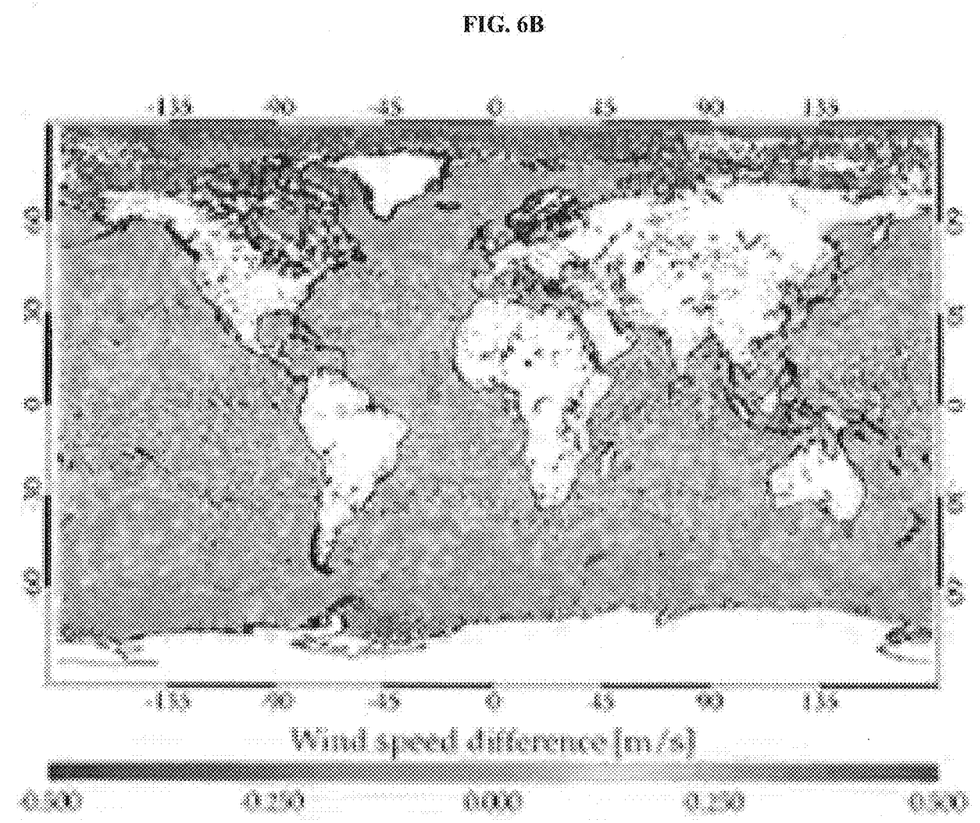
Figure 6C:
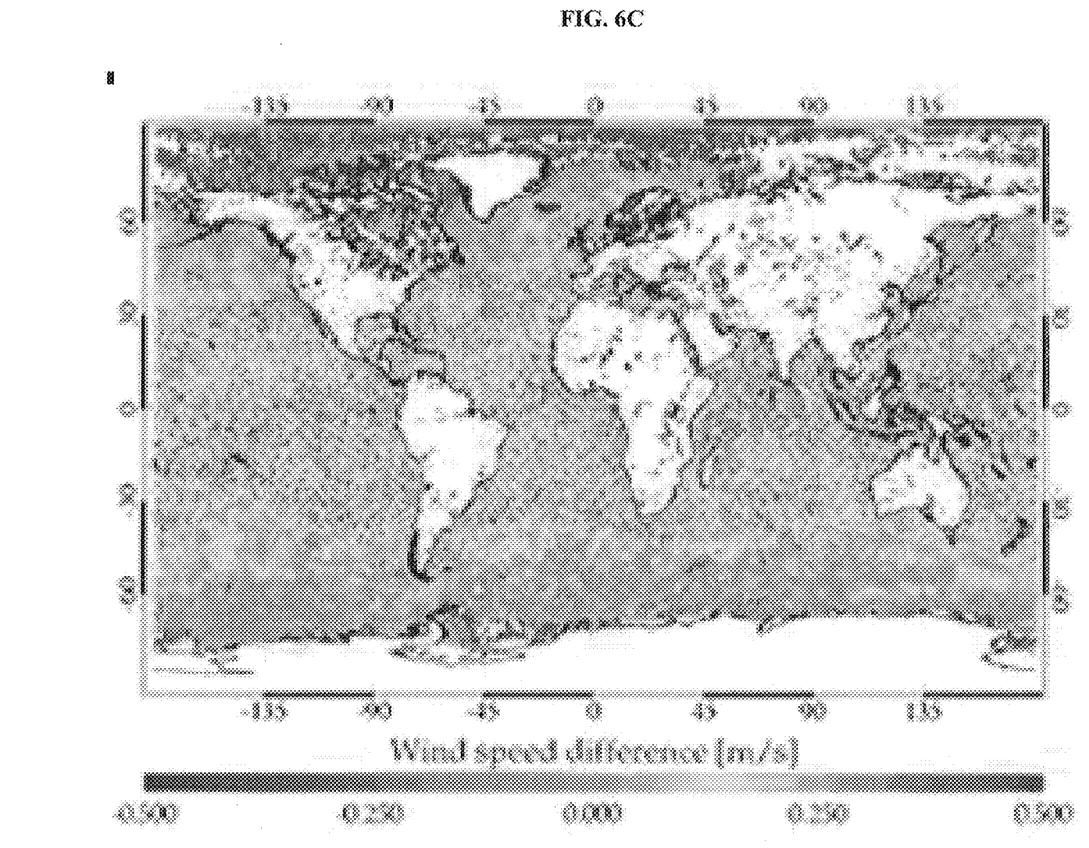
Figure 6D:
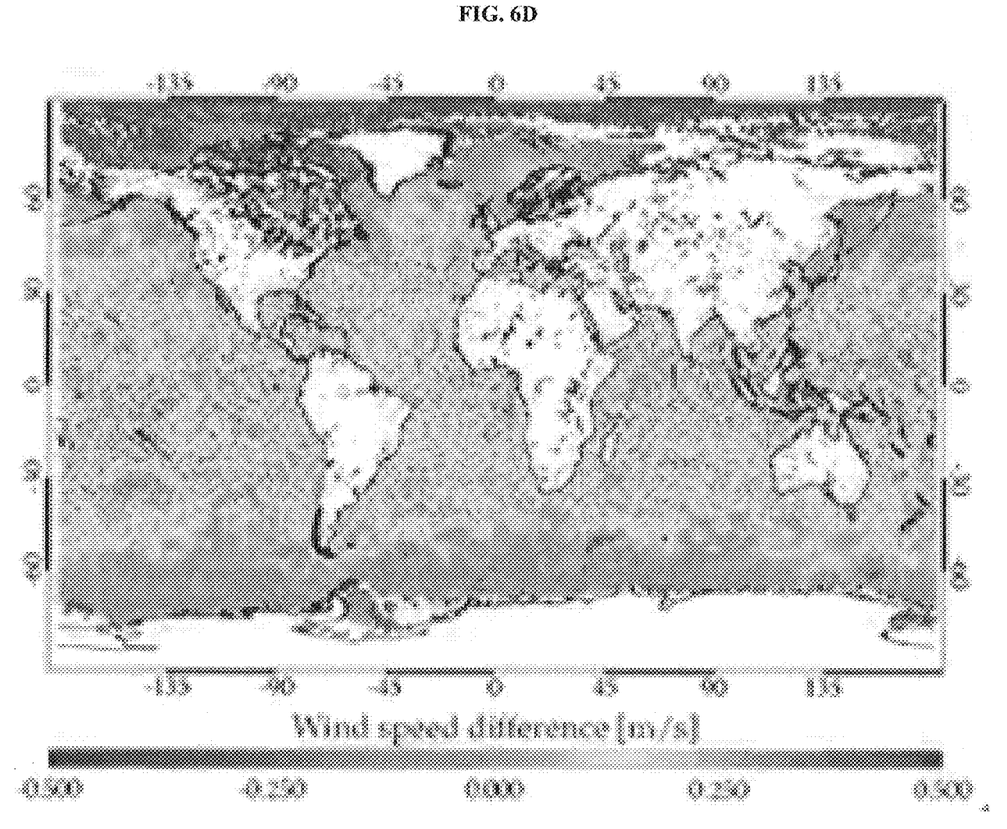

FIG. 5 illustrates an example of a relation expression between the sea-surface wind speed and the sea level roughness by using a satellite microwave sensor. The result of using the AMSR-E sensor is shown in FIG. 5.

Specifically, FIG. 5 represents a relation between the produced sea-surface wind speed and the sea level roughness by channels by using observations of AMSR-E of AQUA, the polar orbit satellite operated by USA.

For input information of wind, GDAPS data, which are the numeric model results published by Korea Meteorological Administration. Among the data published four times a day, GDAPS data corresponding to 06 UTC on Feb. 24, 2009 were used. In order to calculate the sea level emissivity, FASTEM-2, which is the latest land/sea module of the radiation transfer model of the next generation satellite operated by USA and Europe, was used, and it is also used for verifying the accuracy of the inverse conversion method according to the invention.

FIGS. 6A-6D illustrate the results of verifying the results of producting the sea-surface speed according to the invention.

For such verification, GDAS data, which are the numeric model results of USA, was used.

[(a) GDAS SSW on Apr. 11, 2011, GDAS SSW—Retrieved SSA for AMSR-E (b) 6.9 GHz, (c) 10 GHz and (d) 18 GHz channels.]

In other words, FIGS. 6A-6D represent examples of producing the sea-surface wind information by using the relation expression obtained in FIG. 5 and thereby using satellite data, and shows the result of verifying the method presented above.

For such verification, the numeric model result (GDAS) data, which were presented by National Oceanic and Atmospheric Administration in USA, were used, and the data corresponding to 06 UTC on Apr. 10, 2011, a different date from that in the previous example, was selected. The reason why the date and the meteorological organization were made to be different from those in the previous example is to demonstrate that the invention is well applicable to any wind information. Consequently, the invention obtained results with much higher accuracy than the conventional sea-surface wind information observed by a satellite, which was cited in international papers and is used on the job site in foreign countries.

For 6.9 GHz and 10 GHz of AMSR-E and 19 GHz of SSM/I, a difference (error) between the inputted wind information and the produced wind information was found to be approximately within 0.1 m/s, and RMSE (Root Mean Square Error) was found to be within 0.29 m/s.

It can be known that in the aspect of accuracy, such result is very higher than the conventional sea-surface wind information production algorithm result (approximately, an error is 0.5 m/s, RMSE is 1.5 m/s) used in foreign countries.

In other words, it can be identified that when the system according to the invention described above is used, the sea-surface wind strength is very accurately detected.

The term "unit" used for describing many components according to the invention means a software component or a hardware component such FPGA or ASIC, and the "unit" performs a certain function. However, the "unit" does not have a meaning to be limited to software or hardware. The "unit" can be configured so that it may be present in an addressable storage medium and one or more processors may be played back. Therefore, as an example, the "unit" comprises software components, object-oriented software components, class components, task components, processes, functions, attributes, procedures, subroutines, segments of program codes, drivers, firmware, microcode, circuit, data, database, data structures, tables, arrays, and variables. Functions provided within the components and "units" can be combined into a smaller number of components and "units", or divided into additional components and "units" increase. In addition, components and "units" can be implemented so that one or more CPUs may be played back in a device or a security multimedia card.

In the detailed description of the invention as described above, specific embodiments were described. However, many modifications can be made within the scope of the invention. The technical idea of the invention should not be limited to the embodiments described herein, while it should be defined by the following claims and further equivalents to them.

DESCRIPTION OF REFERENCE NUMERALS

110 Observation Sensor Unit
120 Reflectivity Measurement Operation Unit
130 Sea Level Roughness Determination Unit

What is claimed is:

1. A passive system for detecting sea surface wind, the system comprising:

an observation sensor unit that processes radiance temperature of sea water or sea level temperature information using data from a sensor mounted on a satellite;

a reflectivity measurement operation unit that determines polarized light-specific reflectivity as a function of processing the radiance temperature or the sea level temperature transmitted from the observation sensor unit;

a sea level roughness determination unit that determines the sea level roughness, using the polarized light-specific reflectivity produced by the reflectivity measurement operation unit; and a sea surface wind information production unit that uses a regression relation between the determined sea level roughness and the magnitude of the sea surface wind and produces the sea surface wind information.

2. The system for detecting the sea surface wind according to claim 1, wherein the observation sensor unit senses the radiance temperature or the sea level temperature observed at 1-10 GHz, using a microwave satellite sensor mounted on a low latitude satellite.

3. The system for detecting the sea surface wind according to claim 1, wherein the reflectivity measurement operation unit uses the radiance temperature or the sea level temperature, and the polarized light-specific reflectivity $R_R$, is given by:

$$R_R = (T_B - T_\downarrow - T_S \cdot \Gamma) \Gamma [\{T_\downarrow (1+\Omega) - T_S\} \cdot \Gamma]^{-1}$$

wherein, $R_R$ represents a reflectivity, $T_S$ represents a sea level temperature, $T_B$ represents a radiance temperature observed over a microwave channel of AQUA AMSR-E, and $T_\uparrow$ and $T_\downarrow$ are terms showing an atmospheric effect $\Gamma$ represents an atmospheric transmittance, where The fit parameter $\Omega$ is a correction parameter representing how much $T_\downarrow$ is scattered.

4. The system for detecting the sea surface wind according to claim 3, wherein the sea level roughness determination unit determines the sea level roughness given by:

$$\sigma \approx \frac{\lambda}{4\pi\cos\theta} \cdot \sqrt{\ln\left(\frac{R_{R,H}^{sec^2\theta}}{R_{R,V}}\right)}$$

wherein, $R_V$ represents the vertically polarized reflectivity, and $R_H$ represents the horizontally polarized reflectivity, where $R_R$ represents the observed polarized reflectivity, and $\theta$ represents a satellite zenith angle.

5. The system for detecting the sea surface wind according to claim 4, wherein the sea surface wind information production unit produces a relation between the sea level roughness and the sea surface wind, using FASTEM-2, the earth surface/sea level information module.

6. A method of detecting the sea surface wind, comprising:
determining polarized light-specific reflectivity of an observation region of sea, using a radiance temperature and a sea level temperature of the observation region as measured by a sensor on a satellite;
estimating sea level roughness as a function of the polarized light-specific reflectivity;
determining sea surface wind information using a regression relation between the sea level roughness and magnitude of the sea surface wind.

7. The method of detecting the sea surface wind according to claim 6, wherein the polarized light-specific reflectivity is determined via channels of the sea level, using the radiance temperature measured by an a satellite observation sensor.

8. The method of detecting the sea surface wind according to claim 7, wherein the detecting the polarized light-specific reflectivity includes sensing and using radiance temperature or the sea level temperature observed at 1-10 GHz, using a microwave sensor mounted on a low latitude satellite.

9. The method of detecting the sea surface wind according to claim 8, wherein the polarized light-specific reflectivity, $R_R$, is given by:

$$R_R = (T_B - T_\uparrow - T_S \cdot \Gamma) \cdot [\{T_\downarrow(1+\Omega) - T_S\} \cdot \Gamma]^{-1}$$

wherein, $R_R$ represents a reflectivity, $T_S$ represents a sea level temperature, $T_B$ represents a radiance temperature observed over a microwave channel of AQUA AMSR-E, and $T_\uparrow$ and $T_\downarrow$ are terms showing an atmospheric effect $\Gamma$ represents an atmospheric transmittance, where the fit parameter $\Omega$ is a correction parameter representing how much $T_\downarrow$ is scattered.

10. The method of detecting the sea surface wind according to claim 9, wherein the sea level roughness is given by:

$$\sigma \approx \frac{\lambda}{4\pi\cos\theta} \cdot \sqrt{\ln\left(\frac{R_{R,H}^{sec^2\theta}}{R_{R,V}}\right)}$$

wherein, $R_V$ represents the vertically polarized reflectivity, and $R_H$ represents the horizontally polarized reflectivity, where $R_R$ represents the observed polarized reflectivity, and $\theta$ represents a satellite zenith angle.

11. The method of detecting the sea surface wind according to claim 8, further comprising:
producing, via a sea surface wind information production unit, a relation between the sea level roughness and the sea surface wind, using a FASTEM-2 earth surface/sea level information module.

12. The method of detecting the sea surface wind according to claim 11, wherein the polarized light-specific reflectivity is given by:

$$R_R = (T_B - T_\uparrow - T_S \cdot \Gamma) \cdot [\{T_\downarrow(1+\Omega) - T_S\} \cdot \Gamma]^{-1}$$

wherein, $R_R$ represents a reflectivity, $T_S$ represents a sea level temperature, $T_B$ represents a radiance temperature observed over a microwave channel of AQUA AMSR-E, and $T_\uparrow$ and $T_\downarrow$ are terms showing an atmospheric effect $\Gamma$ represents an atmospheric transmittance, where the fit parameter $\Omega$ is a correction parameter representing how much $T_\downarrow$ is scattered.

13. The method of detecting the sea surface wind according to claim 12, wherein the sea level roughness is given by:

$$\sigma \approx \frac{\lambda}{4\pi\cos\theta} \cdot \sqrt{\ln\left(\frac{R_{R,H}^{sec^2\theta}}{R_{R,V}}\right)}$$

wherein, $R_V$ represents the vertically polarized reflectivity, and $R_H$ represents the horizontally polarized reflectivity, where $R_R$ represents the observed polarized reflectivity, and $\theta$ represents a satellite zenith angle.

14. The method of detecting the sea surface wind according to claim 7, wherein the polarized light-specific reflectivity, $R_R$, is give by:

$$R_R = (T_B - T_\uparrow - T_S \cdot \Gamma) \cdot [\{T_\downarrow(1+\Omega) - T_S\} \cdot \Gamma]^{-1}$$

wherein, $R_R$ represents a reflectivity, $T_S$ represents a sea level temperature, $T_B$ represents a radiance temperature observed over a microwave channel of AQUA AMSR-E, and $T_\uparrow$ and $R_\downarrow$ are terms showing an atmospheric effect $\Gamma$ represents an atmospheric transmittance, where the fit parameter $\Omega$ is a correction parameter representing how much $T_\downarrow$ is scattered.

15. The method of detecting the sea surface wind according to claim 14, wherein the sea level roughness is given by:

$$\sigma \approx \frac{\lambda}{4\pi\cos\theta} \cdot \sqrt{\ln\left(\frac{R_{R,H}^{sec^2\theta}}{R_{R,V}}\right)}$$

wherein, $R_V$ represents the vertically polarized reflectivity, and $R_H$ represents the horizontally polarized reflectivity, where $R_R$ represents the observed polarized reflectivity, and $\theta$ represents a satellite zenith angle.

* * * * *